M. JOHNSON.
Improvement in Cultivator and Weeding-Machines.
No. 115,213. Patented May 23, 1871.
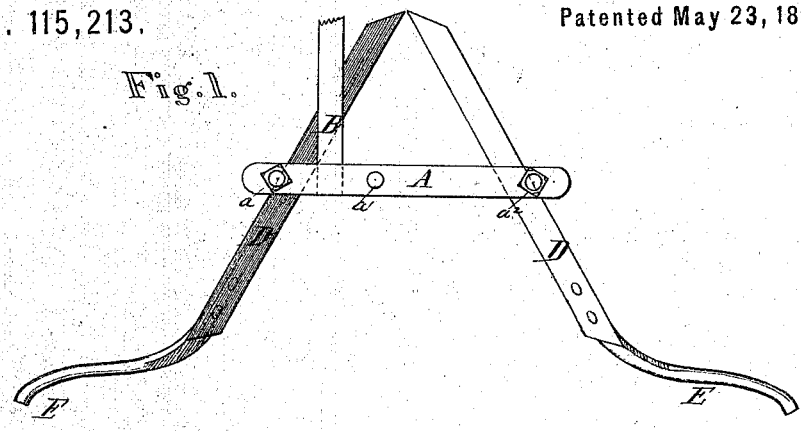
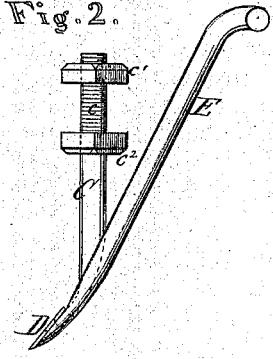
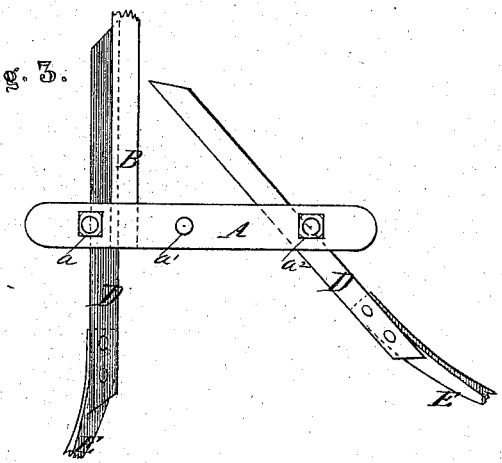
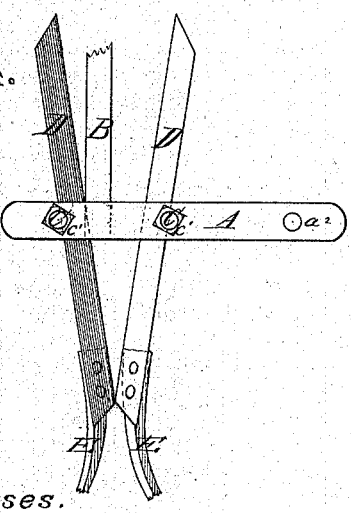
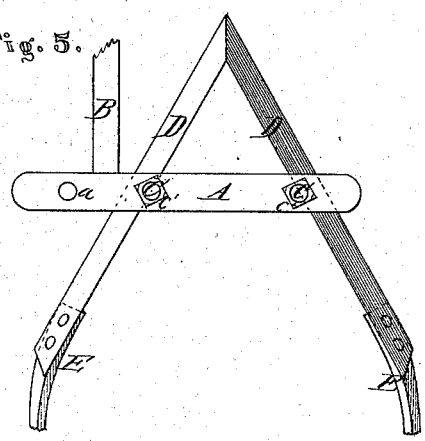
Witnesses.
Villette Anderson
Frank B. Curtis
Inventor.
Moses Johnson
Chipman, Hosmer & Co.
Attys.

UNITED STATES PATENT OFFICE.

MOSES JOHNSON, OF THREE RIVERS, MICHIGAN, ASSIGNOR OF ONE-HALF HIS RIGHT TO JOHN G. OTT, OF SAME PLACE.

IMPROVEMENT IN CULTIVATORS AND WEEDING-MACHINES.

Specification forming part of Letters Patent No. 115,213, dated May 23, 1871.

*To all whom it may concern:*

Be it known that I, MOSES JOHNSON, of Three Rivers, in the county of St. Joseph and State of Michigan, have invented a new and valuable Improvement in Cultivators and Weeding-Machines; and I do hereby declare that the following is a full, clear, and exact description of the construction and operation of the same, reference being had to the annexed drawing making a part of this specification, and to the letters and figures of reference marked thereon.

Figure 1 of the drawing is a top view of implement arranged to go between hills. Fig. 2 is a view of blade, shank, and handle. Fig. 3 is a top view of implement arranged to go astride hills. Fig. 4 is a top view of implement as hereinafter described. Fig. 5 is a top view, showing the machine arranged with lateral draft and reversed blades.

The object of this invention is to provide an efficient implement for cutting away weeds from growing corn or other vegetation which has been planted in rows, and, at the same time, answering the purpose and performing the work of a cultivator. It consists of a pair of horizontal blades attached to the sides of a frame or cross-head by means of vertical swivels so that the blades may be adjusted to different angles, the swivels being formed with screws on their upper ends and provided with nuts in order that the proper position of the blades may be rigidly retained. Handles are secured to the ends of the blades to operate them, and a tongue attached to the cross-head.

A in the drawing represents the cross-head, in which three swivel-holes, $a$ $a^1$ $a^2$, are cut. B is the beam or tongue, attached to the cross-head nearer one end than the other. C represents the swivels or blade-shanks, of a size to fit and turn in the swivel-holes. On the upper ends of said shanks screw-threads $c$ are formed to hold nuts $c^1$. $c^2$ are nuts placed on the shanks below the cross-head to keep the shanks and cross-head in proper relative position. The lower ends of said shanks are flattened and slightly bent, and the blades D D bolted thereto. These blades consist of metallic plates or strips with beveled ends, as shown. The forward ends and the lower edges of the blades are beveled off sharp, and constitute cutters to cut away weeds. The surfaces of the blades, it will be observed, are inclined in accordance with the bend of the shank ends to which they are attached. E E are handles bolted to the rear ends of the blades, and curving upward and backward.

The operation of the above-described implement is as follows: To pass between the rows of corn the blades are arranged as shown in Fig. 1, in which position they scrape the ground, cut away the weeds and grass, and level the earth, at the same time cultivating the plant. Fig. 4 represents the implement adjusted to go astride the hills. For this purpose the right-hand blade is changed to the middle hole $a^1$, in which the spindle or shank is inserted and the nut $c^1$ loosened to allow the blades to swing. As the implement approaches a hill the handles E E are brought together, thereby separating the points of the blades, which are kept in that position until the points pass the hill, when they are brought together by separating the handles, allowing the rear ends of the blades to pass on either side of the hill. The mode of using the implement as just described can only be adopted in cultivating young corn or plants, since otherwise they would be broken. Fig. 5 shows an adjustment which places both blades, with their shanks, to one side of the draft-beam, illustrating the possible change from center to lateral draft. This figure also shows the relative positions of the blades reversed, making the blades incline inwardly and meet at their points to form a plow. Fig. 3 represents the blades in another position, in which one forms a "land-side," being arranged parallel to the line of travel.

Having fully described my invention, what I claim as new, and desire to secure by Letters Patent, is—

The implement herein described, consisting of the cross-head A, beam B, shanks C, nuts $c^1$ $c^2$, blades D, and handles E, when the same are constructed and arranged to operate as and for the purpose set forth.

In testimony that I claim the above I have hereunto subscribed my name in the presence of two witnesses.

MOSES JOHNSON.

Witnesses:
E. H. LOTHROP,
E. H. LOTHROP, 2d.